3,407,169
HEAT RESISTANT ADHESIVE

Albin C. Johnson, Campbell, and Robert C. Shaffer, Mountain View, Calif., assignors, by direct and mesne assignments, to the United States of America as represented by the Secretary of the Navy
No Drawing. Filed Feb. 25, 1965, Ser. No. 435,386
1 Claim. (Cl. 260—38)

ABSTRACT OF THE DISCLOSURE

A structural adhesive that will maintain its adhesive strength at high temperatures. A preparation composed of a silicone phenolic resin, an epoxy resin, an epoxy hardener and a nickel powder filler which is functionally stable at a temperature range of from −65° to 1500° F.

---

The present invention relates to the preparation of a structural adhesive which will maintain its adhesive strength at high temperatures.

Adhesives are currently produced employing heat convertible resins which contain various filler materials, i.e., aluminum powder, steel powder, etc. These adhesives have been used in the temperature range of −100° F. to temperatures in the range of 1000° F. It is not new in the art to add filler material to adhesives and the usual material used is powdered aluminum. The addition of the filler increases the shear strength, particularly at higher temperatures. It is highly desirous to obtain an adhesive that will have a useful temperature range between −65° F. to 1500° F. with the major emphasis placed on the temperature range between 1000° F. and 1200° F.

It is therefore the object of the present invention to provide an adhesive having a metallic filler which is functionally stable at high temperatures, with emphasis placed on temperature range between 1000° F. and 1200° F.

It is another object of the present invention to provide an adhesive which will have a shear strength which is better than any presently known adhesives, particularly at higher temperatures.

It is still another object of the present invention to provide an adhesive composed of a resin which will form a solid, non-soluble, non-fusible resin upon either the application of heat or upon the addition of special hardening agents.

It is a further object of the present invention to provide an adhesive formed of a resin together with a filler of powdered nickel.

It is a still further object of the present invention to provide an adhesive having a filler of nickel powder with the particle size of the nickel held in the range of 0–20 microns.

Other objects, advantages and novel features of the invention will become apparent from the following detailed description of the invention.

The adhesive which forms the subject of this invention is comprised of a heat convertible resin, i.e., a resin which will form a solid, non-soluble, non-fusible final resin either upon the application of heat or upon the addition of a special hardening agent. To this resinous material is added nickel powder having a particle size in the range of from 0–20 microns.

The addition of metallic powders to adhesives to increase the shear strength is not in itself new. Aluminum powder has been added as a filler material but the addition of nickel, particularly when the particle size was in the range of from 0–20 microns, exhibits very different physical properties when tested in shear at 1000° F. to 1500° F. Adhesives employing the usual metallic fillers yielded shear values at 1500° F. that were below the values obtained at 1000° F. with a nickel filler. Likewise the shear values obtained, with a nickel filler at 1500° F. were above those obtained from the adhesive with the usual fillers at 1000° F. This action shows that the nickel has more value to the adhesive than that of being a filler, that it adds to the function of the adhesive. It has also been found that the particle size of the nickel filler is a factor in obtaining the above values. Nickel powder which has a particle size in the range of 0–20 microns produced an adhesive having the highest shear values.

EXAMPLES OF THE FORMULATION

(I)

| | Parts |
|---|---|
| Heat convertible phenolic resin | 70 |
| Heat convertible epoxy resin | 30 |
| Hardener for the epoxy | .3 |
| Nickel filler (powder) | 150 |

The resin portion of the adhesive heated at 200° F. for 12 minutes and then spread upon glass fabric and cooled.

(II)

| | Parts |
|---|---|
| Silicone phenolic resin | 65 |
| Epoxy resin—Epon 1001 | 35 |
| Dicy | .25 |
| Nickel filler | 350 |

Dicy is the trade name of an epoxy hardener.

The mixture heated to 200° F. for 20 minutes and then spread upon a suitable carrier system such as glass fabric 112 finish Volan A.

| | Parts |
|---|---|
| Phenolic silicone 98–570–0 | 85 |
| Epon 1001 | 15 |
| Dicy | 15 |
| Nickel powder (0–20) | 260 |

(III)

| | Parts |
|---|---|
| Silicone phenolic resin | 75 |
| Epoxy resin—Epon 1001 or equivalent | 25 |
| Dicy | .25 |

The exact definition of the above trade named compounds are as follows:

Epon 1001—Epoxy resin with a basic repeating unit consisting of the reaction product of 1 mol of bis-phenol A and 2 mols of epichlorhydrin with an average molecular weight of 1000–1500.

Phenolic-silicone (98–570–0)—Reaction product of a low molecular weight resole and a silanol functional silane resin. The resole is a reaction product of formaldehyde and phenol in ratios of from one mole of formaldehyde and one mole of phenol to one mole of formaldehyde and two mols phenol. The finished resin has an average molecular weight of 250.

Dicy—Dicyandiamid.

An adhesive of this type using powdered nickel as a filler has an increased performance particularly in lap shear strength when bonding such materials as stainless steel, graphite, etc., at temperatures in the range between 1000° F. and 1500° F.

While this invention has been described in detail, it is to be understood that certain changes may be made without departing from the invention, in the types of resin used and in the amounts and particle size of the filler used.

What is claimed is:

1. An adhesive adapted to be applied at a temperature of approximately 200° F., comprising:
    approximately 23% of the reaction product of a low molecular weight resole and a silanol functional silane resin;

approximately 4% of an epoxy resin with a basic repeating unit consisting of the reaction product of 1 mol of bis-phenol A and 2 mols of epichlorhydrin;

approximately .04% of dicyandiamid; and approximately 72% of nickel powder of a particle size of from 0–20 microns, said mixture being characterized by an excessive shear strength at temperatures above 1000° F.

References Cited

UNITED STATES PATENTS

| 2,575,265 | 11/1951 | Fiedler et al. | 161—196 |
| 2,803,610 | 8/1957 | Kress | 260—24 |
| 3,043,796 | 5/1962 | Novak et al. | 260—37 |
| 3,284,398 | 11/1966 | Warren et al. | 260—37 |

MORRIS LIEBMAN, *Primary Examiner.*

S. L. FOX, *Assistant Examiner.*